(12) United States Patent
Kälvesten et al.

(10) Patent No.: US 7,017,420 B2
(45) Date of Patent: Mar. 28, 2006

(54) MINIATURIZED PRESSURE SENSOR

(75) Inventors: Edvard Kälvesten, Hagersten (SE); Patrik Melvås, Vapengatan 20, Hagersten (SE) S-126 52; Göran Stemme, Ruddammsvagen 31B, Stockholm (SE) S-114 21

(73) Assignees: Silex Microsystems AB, Jarfalla (SE); Patrik Melvas, Taby (SE); Goran Stemme, Stockholm (SE)

( * ) Notice: Subject to any disclaimer, the term of this patent is extended or adjusted under 35 U.S.C. 154(b) by 84 days.

(21) Appl. No.: 10/479,802

(22) PCT Filed: Jun. 7, 2002

(86) PCT No.: PCT/SE02/01116

§ 371 (c)(1),
(2), (4) Date: Apr. 16, 2004

(87) PCT Pub. No.: WO02/101347

PCT Pub. Date: Dec. 19, 2002

(65) Prior Publication Data

US 2004/0168519 A1    Sep. 2, 2004

Related U.S. Application Data

(60) Provisional application No. 60/296,678, filed on Jun. 8, 2001.

(51) Int. Cl.
*G01L 9/04* (2006.01)

(52) U.S. Cl. .......................................... 73/724
(58) Field of Classification Search ................. 73/702, 73/703, 704, 706, 715–727, 756
See application file for complete search history.

(56) References Cited

U.S. PATENT DOCUMENTS

| | | | |
|---|---|---|---|
| 3,461,416 A | 8/1969 | Kaufman | |
| 4,141,253 A | 2/1979 | Whitehead, Jr. | |
| 5,317,917 A | 6/1994 | Dufour | |
| 5,569,856 A | 10/1996 | Jacobs-Cook | |
| 6,092,424 A | 7/2000 | Skinner et al. | |
| 6,182,513 B1 | 2/2001 | Stemme et al. | |

FOREIGN PATENT DOCUMENTS

| | | |
|---|---|---|
| EP | 0 531 696 | 3/1993 |
| EP | 0 649 009 | 4/1995 |
| WO | WO 00/39550 | 7/2000 |

*Primary Examiner*—William Oen
(74) *Attorney, Agent, or Firm*—Young & Thompson

(57) ABSTRACT

An entirely surface micromachined free hanging strain-gauge pressure sensor is disclosed. The sensing element consists of a 80 μm long H-shaped double ended supported force transducing beam (16). The beam is located beneath and at one end attached to a square polysilicon diaphragm (14) and at the other end to the cavity edge. The sensor according to the invention enables a combination of high pressure sensitivity and miniature chip size as well as good environmental isolation. The pressure sensitivity for the sensor with a H-shaped force transducing beam, 0.4 μm thick was found to be 5 μV/V/mmHg.

24 Claims, 7 Drawing Sheets

MINIATURIZED PRESSURE SENSOR

The present invention relates to miniaturized pressure sensors. More specifically it relates to such a sensor wherein the sensitivity has been substantially improved by providing a force transducing beam inside a vacuum cavity. The sensitivity is improved by the mechanical leverage effect obtained by making the beam suspended by a diaphragm in one end point. In a preferred embodiment it relates to a pressure sensor employing a strain gauge as the pressure transducing element.

BACKGROUND OF THE INVENTION

Blood pressure measurement in the coronary artery is most commonly performed using a fluid filled catheter that transfers the pressure to a external pressure sensor or by a catheter based pressure sensor inside the artery. By measuring the pressure with a miniature sensor inside the artery the time response as well as the accuracy can be improved. The miniature sensor based measurement is well suited for use in balloon angioplasty procedures.

Pressure sensors intended for use in medical catheter based intravascular applications needs to be ultra miniaturized. To achieve a reliable measurement in the blood vessels the pressure sensors also needs to have a built in pressure reference. Vacuum or a low pressure is preferred to minimize temperature drift. Several techniques using MEMS technology have been proposed with optical reflective and interferometric, capacitive and piezoresistive detection. Piezoresistive detection technique is more favorable than capacitive detection for miniaturized sensors due to better scaling characteristic. An earlier reported absolute pressure sensor uses a piezoresistive strain gauge provided on top of a pressure deflectable diaphragm.

A successfully commercialized ultraminiaturized absolute pressure sensor is using the piezoresistive detection technique. The sensor accomplishes a leverage effect by separating the strain-gauge from the diaphragm with an insulation layer to obtain an increase of the sensitivity. However, the thickness of such an insulator also stiffens the diaphragm, thus reducing the sensitivity.

SUMMARY OF THE INVENTION

Thus, in view of the restricted sensitivity of the above discussed prior art sensor, the inventors have sought to develop an improved sensor. This has now been achieved by a sensor comprising a vacuum cavity sealed by a diaphragm, in which a leverage of the deflection of the diaphragm caused by the pressure exerted thereon, is achieved by suspending a force transducing beam in the diaphragm inside the vacuum cavity. The leverage brings about an amplification of the signal from the strain gauge on said beam.

The deflection is sensed in one embodiment by a H-shaped free-hanging strain-gauge which is located beneath, and fully enclosed by, the diaphragm, inside the reference vacuum cavity. This enables a leverage effect without the need for an insulation layer, which would introduce unwanted stiffening. The strain-gauge is thin and only supported at the beam ends (reffered to by the expression "free-hanging") to further reduce stiffening effects and thereby increasing the pressure sensitivity.

Also, the sensor is fabricated using only surface micro machining techniques.

The novel pressure sensor according to the invention is defined in claim 1.

Namely, the miniaturized pressure sensor, comprises a support body having an upper surface and a depression formed in said surface, a diaphragm, covering said depression so as to form a closed cavity, said diaphragm being responsive to external pressure by being deflected, a strain gauge attached at one end to said support body inside said cavity and beneath said diaphragm, and at another end suspended by said diaphragm.

Alternatively, the miniaturized pressure sensor, comprises a support body with an evacuated cavity formed therein, a diaphragm forming a sealing cover for said cavity, and a strain gauge coupled to the support body and said diaphragm such that a deflection of said membrane caused by a pressure exerted thereon causes a detectable change in strain in said strain gauge.

Preferably, the miniaturized pressure sensor, comprises a diaphragm responsive to pressure by being deflected, and a free-hanging strain gauge responsive to strain by yielding an electrical output signal, said strain gauge being suspended at one end by said diaphragm, such that a deflection of said diaphragm causes a detectable change in strain in said strain gauge.

BRIEF DESCRIPTION OF THE DRAWINGS

The invention will now be described in detail with reference to the drawings, in which.

DETAILED DESCRIPTION OF PREFERRED EMBODIMENTS OF THE INVENTION

Figure 1:
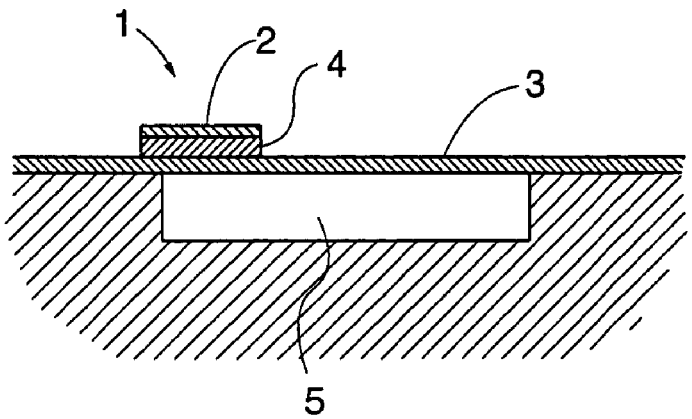
FIG. 1 illustrates a prior art sensor.

FIG. 1 shows a prior art piezo resistive pressure sensor 1, where the strain gauge 2 comprising a piezo resistive element is provided on top of the diaphragm 3 with an insulating layer 4 disposed therebetween. The diaphragm covers a reference vacuum cavity 5. As already indicated above, this insulation layer, although increasing the sensitivity to some degree, also causes a stiffening of the diaphragm, which counteracts the effect of the insulation layer.

Figure 2:
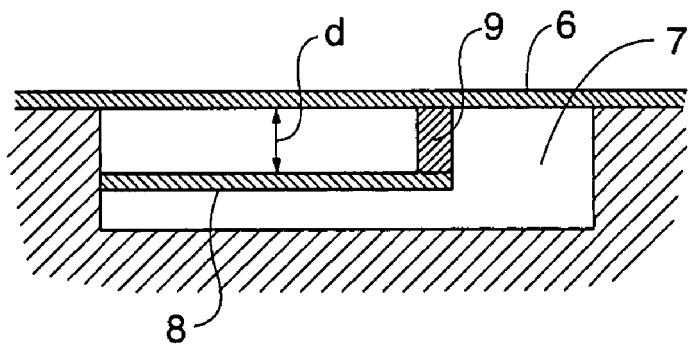
FIG. 2 schematically illustrates the principle of the present invention.
Figure 3:
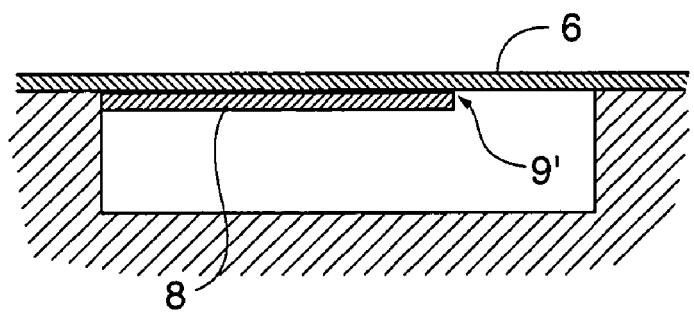
FIG. 3 schematically illustrates an embodiment of the invention.

In FIG. 2 a sensor according to the invention is schematically illustrated in cross section. It comprises a diaphragm 6 covering a reference vacuum cavity 7. Within the cavity 7 and suspended by the diaphragm 6 by means of a finite suspension member 9 at one end, a force transducing beam 8 is provided. The beam 8 is attached at its other end inside the cavity such that there will be a finite distance between the diaphragm and the beam. However, it is also possible to make the diaphragm 6 and beam 8 so as to be located in very close proximity to each other, as schematically illustrated in FIG. 3. here, the beam is attached similarly to the embodiment in FIG. 2, but the suspension is basically a point attachment (at 9' in FIG. 3) rather than by means of suspension member. Such a design will also yield the desired leverage effect, but will be more difficult to manufacture.

Now an embodiment of a miniaturized pressure sensor according to the present invention will be described with reference to FIG. 4, which is perspective view with parts broken away for clarity.

It comprises a support body 10, e.g made of silicon although other materials are possible provided they can be micro-machined to the structures required for achieving a properly functioning sensor. A depression 12 is formed in the support body so as to provide a closed vacuum cavity when covered by a diaphragm 14. This diaphragm covers not only the cavity, but the entire sensor surface, which has certain beneficial effects, which will be discussed below. The diaphragm 14 is responsive to external pressure by being deflected. A strain gauge 16 is attached at one end to said support body inside said cavity and beneath said diaphragm, and at another end suspended via a suspension element 18 by said diaphragm, so as to be what is referred to for the purpose of this application as "free hanging", as opposed to the prior art device shown in FIG. 1, where the strain gauge is attached on the diaphragm.

Thus, the sensor design consists of an integrated vacuum cavity as a pressure reference in which the strain-gauge is suspended. The sensor is fabricated using only surface micro machining to allow small chip sizes. Suitable dimensions of the fabricated pressure sensor are listed in Table 1, although of course the dimensions can be varied as desirable within the limits of the manufacturing technology.

In the shown embodiment, the pressure sensitive part is a square polysilicon diaphragm 14. A force transducing strain sensitive beam 16 is attached to the support body inside the vacuum cavity at one end and to the diaphragm at the other, as shown in. The gap (d in FIG. 2) between the polysilicon beam and the diaphragm is 1.6 µm in this embodiment.

TABLE 1

Suitable dimensions of the fabricated pressure sensor.

| | |
|---|---|
| Diaphragm side length, a | 100 µm |
| Diaphragm thickness, $t_d$ | 2 µm |
| Cavity depth, $h_c$ | 2.5 µm |
| Beam length, L | 80 µm |
| Beam width, $w_b$ | 30 µm |
| Beam thickness, $t_b$ | 0.4 µm |
| Gap between diaphragm and beam, h | 1.6 µm |

Figure 4:
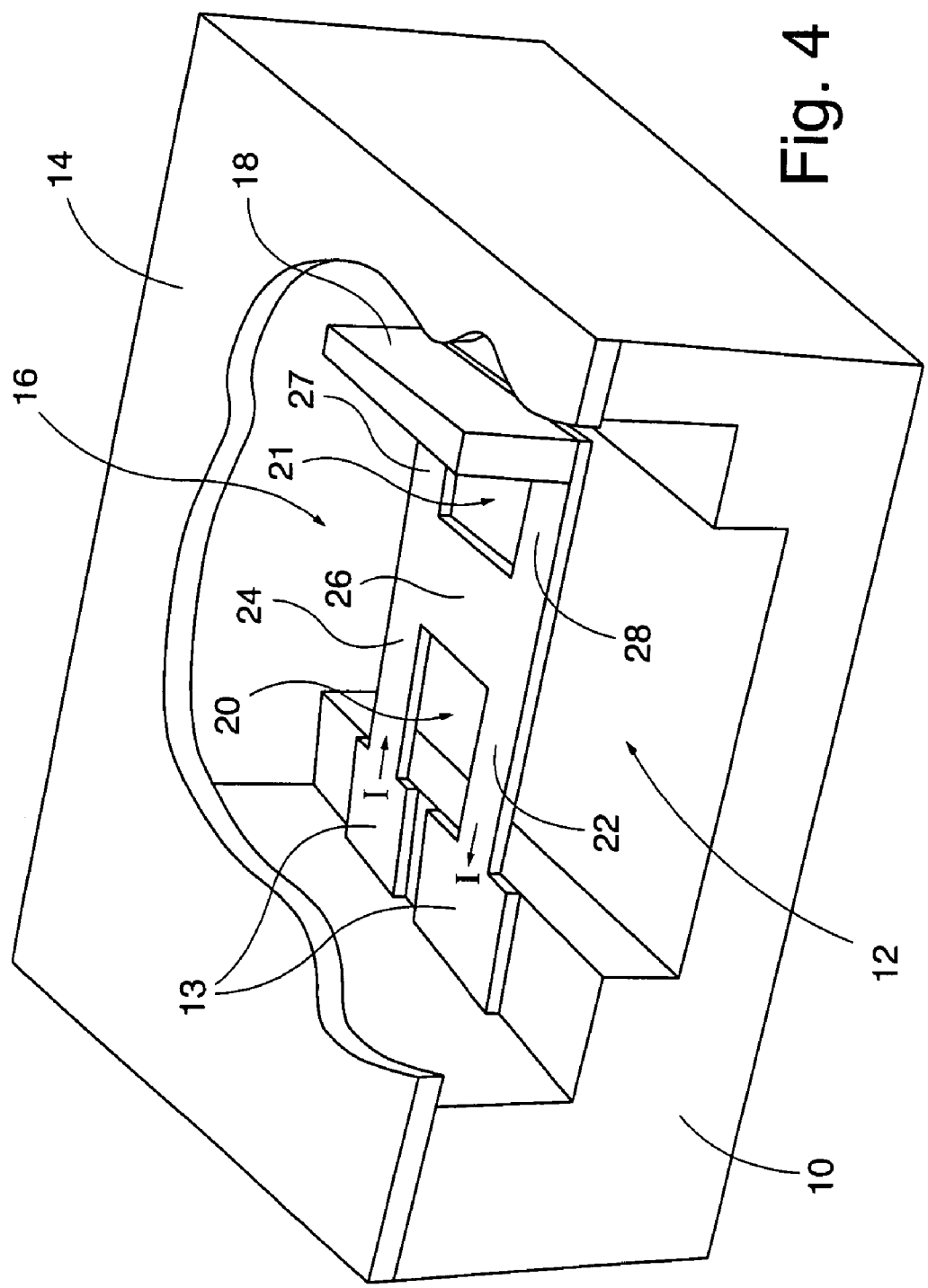
FIG. 4 is a perspective view with portions broken away illustrating an embodiment of the present invention.
Figure 5:
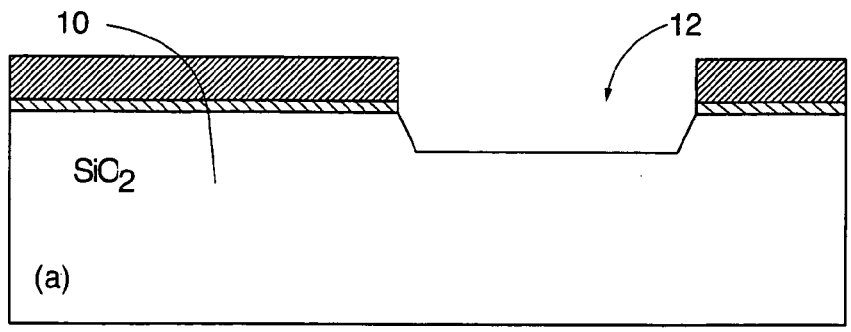
FIGS. 5–8 show steps in the process of manufacturing a sensor according to the invention.
Figure 6:
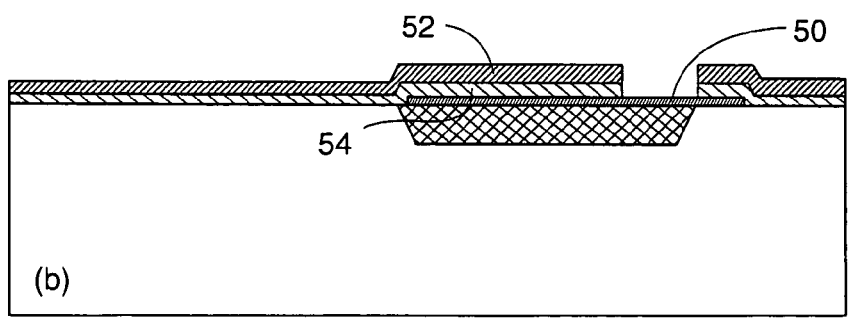
Figure 7:
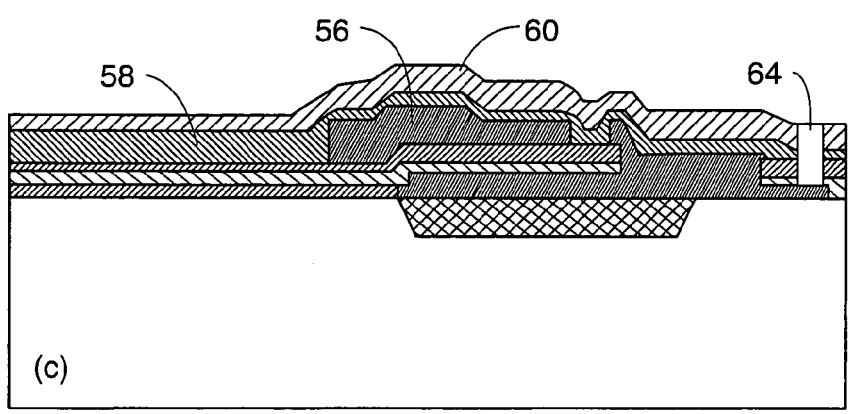
Figure 8:
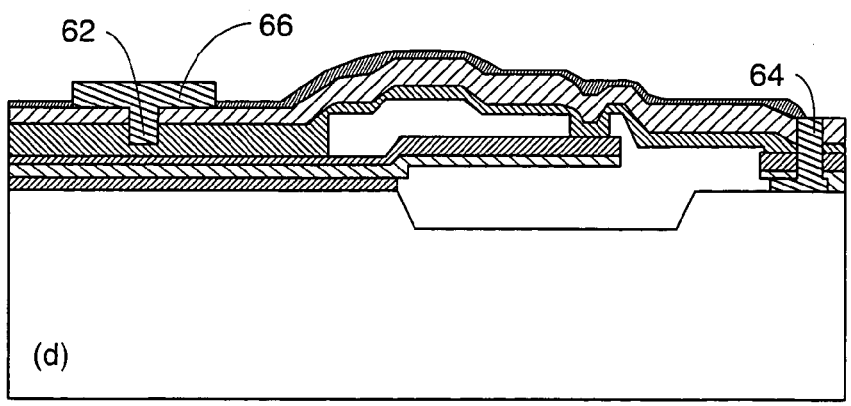

The diaphragm layer covers not only the cavity but the entire sensor surface, as can be seen in FIG. 4. Thereby, the diaphragm creates a fluidic as well as an electrical barrier between the surrounding liquid and both the strain-gauge and the necessary electrical leads located in the embedded polysilicon layer.

In the shown embodiment, the force transducing beam has been shaped in order for the current I to flow along one side of the beam and back along the other side, schematically shown by arrows. The current is taken up via contact pads 13, which are further connected to internal electrical leads internal of the structure (not shown). The current path has been achieved in the illustrated embodiment, by providing "cut outs" 20, 21 in the beam 16 so as to form two legs 22, 24 and a transverse member 26 connecting the legs 22, 24, and two further legs 27, 28 in which the suspension member 18 is attached. Thus the overall shape of the strain gauge or beam 16 is that of an "H". In this way an insulated current path is created, and this enables an integration of the piezoresistive strain-gauge in the polysilicon beam layer. The "H"-shape is of course only exemplary, and any shape that exhibits the "leg-and-connector" structure would do, e.g. an "X"-shape. A "Y"-shape where the double leg end forms the two conductors and the single leg is attached to the suspension member would also be possible. Also a "U" shape is possible, if only one "cut out" is made, so as to form only two legs in the beam member.

Thus, generally the legs of the strain gauge are attached to the support body, and the portion comprising the part where the legs are connected to each other is attached to the diaphragm, i.e. at or beyond the point where the legs are connected to each other.

The transverse connecting member is preferably located at a distance from the point of attachment in the support body that corresponds to at least 50% of the total length of the strain gauge.

The point where the strain gauge is suspended by the diaphragm is located at a distance from the point of attachment in the support body that corresponds to at least 70%, preferably 80% of the width of the diaphragm in the direction of the strain gauge.

However, the point where the strain gauge is suspended by the diaphragm can also be located at a distance from the point of attachment in the support body that corresponds to not more than 30%, preferably not more than 20% of the width of the diaphragm in the direction of the strain gauge.

In an alternative embodiment it is also possible to make a strain-gauge by diffusing an electrically conductive path into a rectangularly shaped beam. However, in this case a current leakage between the legs of the strain-gauge will occur, reducing the efficiency of the device.

Another option for making the current path on the beam is to provide an insulating material in a pattern corresponding at least to the current path (i.e. it can have a large extension than the pattern), and to provide a conducting material on top of said pattern, so as to form strain sensitive leads on the beam. The pattern can take basically any shape, e.g. any of the shapes recited above, or other more complex patterns. Limiting factors on the conductor could be length, the longer the conductor is the more heat would be generated, which could affect the measurement.

The active strain sensing part of the H-shaped beam, is mainly the first part, i.e. the loop consisting of legs 22, 24 and transverse connecting member 26, since the measured resistance change in the second part, legs 27, 28, although it is as sensitive, is negligible compared (in absolute numbers) to the measured resistance change of the first part.

To achieve a high sensitivity and to take full advantage of the leverage arm (between the beam and the diaphragm at the attachment point) a FEM-model was made to numerically calculate the sensor behavior. The position of the diaphragm attachment point (the beam length) was investigated for maximum pressure sensitivity. The highest sensitivity was reached with a beam length of 80 µm, and a square diaphragm 100 µm×100 µm. For other geometries other optimal attachment points can easily be found, by FEM calculations.

The expected output signal in a Wheatstone bridge configuration with a supply voltage $U_{bridge}$ for the leverage beam pressure sensor is $$\frac{U_{out}}{U_{bridge}} = \frac{\Delta R}{4R} = \frac{\varepsilon_x G_{par} + \varepsilon_y G_{per}}{4} \cong \frac{\varepsilon_x G_{par}}{4}$$

were R is the resistance, of each of the four resistors, $G_{par}$, $G_{per}$ is the longitudinal and transverse gauge factors, respectively, and $\varepsilon_x$ is the pressure induced strain numerically calculated to 0.3 µ/mmHg. $G_{par}$ is estimated to 22 and the longitudinal strain of the resistor is assumed to be dominating the contribution of the resistance change.

The calculated pressure sensitivity (defined as the relative change of output voltage versus applied pressure) for the free hanging force transducing strain gauge pressure sensor is 2 µV/V/mmHg which is less than the measured sensitivity of 5 µV/V/mmHg. The difference is probably due to the fact that the gauge factor is estimated in combination with the simplifications in the FEM-model which was build for optimization purposes.

Now a method of making a sensor according to the invention will be described with reference to FIGS. 5–8. The fabrication process starts with defining the cavity 12 in the support body 10 by a KOH etching and a LOCOS oxidation, FIG. 5. A TEOS layer 50 is then deposited and defined to serve as etch channels. The strain-gauge structure is formed by a layer 52 of polysilicon and low stress silicon nitride 54, FIG. 6. Deposition and patterning of a new layer 56 of TEOS (FIG. 7) defines the spacing between the diaphragm and the strain-gauge structure as well as the attachment point. The diaphragm 14 is made of a thin layer 58 of low stress silicon nitride and a layer 60 of polysilicon. Electrical contact holes 62 and channels 64 for the etching solution (50% HF) are opened by RIE etching, FIG. 5c. The HF etches the silicon dioxide and TEOS, leaving the strain-gauge 16 suspended in a chamber. The chamber is vacuum-sealed with TEOS in a LPCVD process, FIG. 8. Finally, aluminum is sputtered and patterned to define the metal conductors 64, FIG. 8.

The pressure sensitivity was measured by connecting the piezoresistive strain gauge together with three external resistors in a full Wheatstone bridge configuration. The bridge was supplied with a constant voltage of 8.3 V and the output signal measured using a HP 34401A multimeter. The pressure sensitivity was measured by placing the sensor inside a pressure chamber and applying an overpressure from 0 to 300 mmHg.

Figure 9:
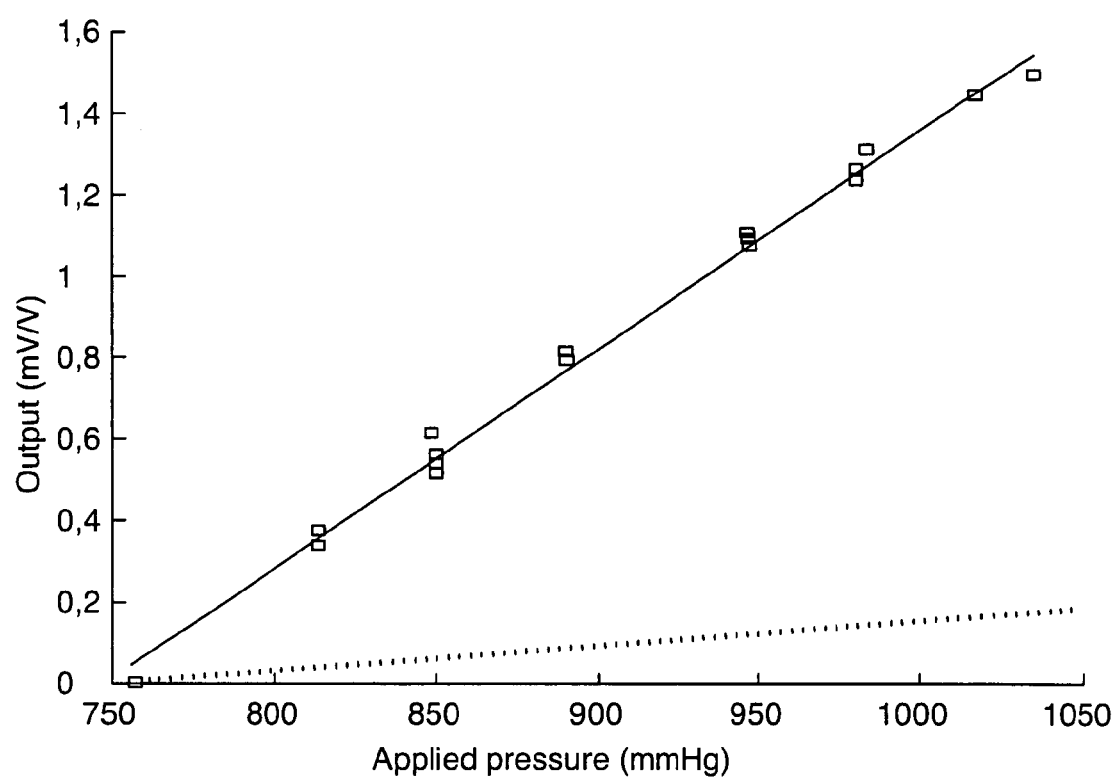
FIG. 9 illustrates the improved sensitivity of the sensor according to the invention.

The results of the measurements are presented in FIG. 9. A sensor with a diaphragm of only 100×100×2 µm and a H-shaped strain-gauge of 80×40×0.4 µm has a high (for miniaturized sensors) measured pressure sensitivity of 5 µV/V/mmHg. The new fabricated free-hanging strain-gauge sensor has about 5 times higher sensitivity than a 1 µm thick rectangular leverage beam with a 0.4 µm thick piezoresistor 11 and about 8 times higher than an earlier reported sensor with 100×100 µm diaphragm scaled to equal diaphragm thickness of 2 µm. The H-shape is preferred since it realizes a piezoresistive strain-gauge and minimizes the stiffness.

The new design (X, Y, U or H shape) increases the pressure sensitivity compared to traditional and a rectangular shape force transducing beam design. The sensitivity for the ultra miniature pressure sensor has been measured to 5 µV/V/mmHg. The sensor is fabricated using only surface micromachined processes and constitutes of a 80 µm long H-shaped free hanging force transducing beam, located beneath, a square 2 µm thick polysilicon diaphragm with a side length of only 100 µm. The new sensor enables a combination of high pressure sensitivity and miniature chip size as well as good environmental isolation which makes it suitable for use in intravascular applications.

Figure 10A:
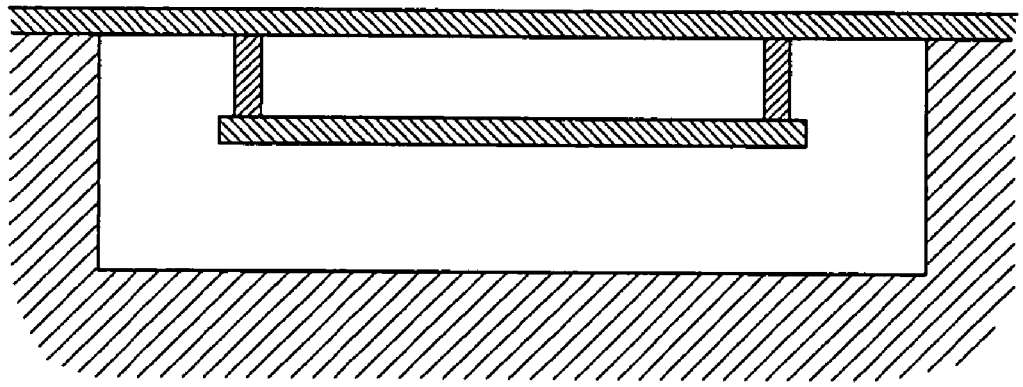
FIG. 10 illustrates a further embodiment of the invention providing increased sensitivity.
Figure 10B:
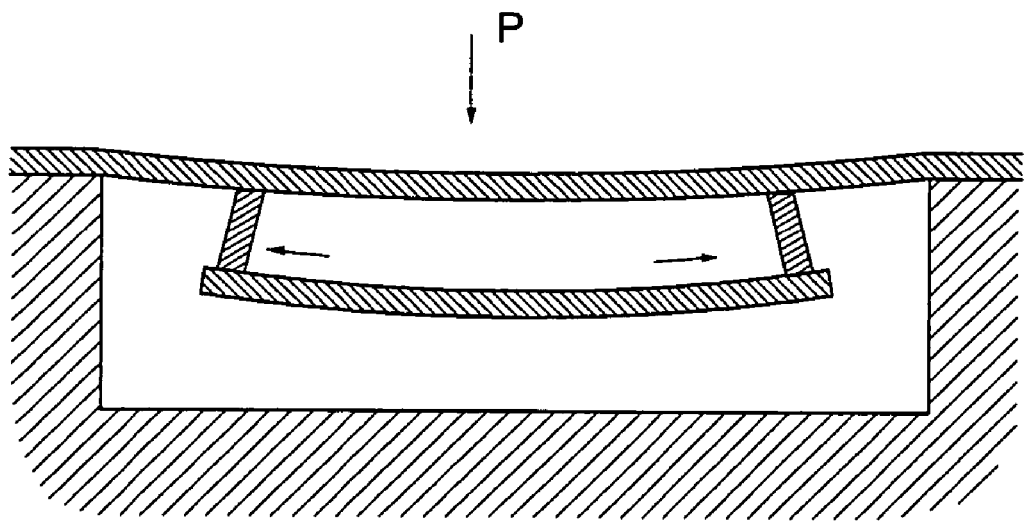

In another embodiment of the invention the leverage effect is achieved by suspending the force transducing beam in the diaphragm at both ends, i.e. in two points on the diaphragm. Thereby a double leverage effect is attainable by suspending the beam on opposite sides of the midpoint of the diaphragm, as shown in FIGS. 10a and 10b.

A deflection of the membrane will cause the suspension elements to pull the beam in opposite direction, thereby further increasing the strain, and thereby the sensitivity of the device. A drawback with this embodiment is that electrical connections will have to be on the diaphragm, which could have a stiffening effect that would counteract the increased sensitivity to some extent.

Piezoresistive detection inherently has a high temperature dependence, which should be compensated for.

Prior art miniaturized pressure sensors with piezoresistive detection commonly have two piezoresistors connected in a half bridge (or four piezoresistors connected in a full bridge) configuration for temperature compensation. The resistors are either located on the pressure sensing diaphragm (of which one has a positive gauge factor and the other have a negative) or one piezoresistor is placed on the diaphragm and the other on the substrate. In the latter configuration the piezoresistor on the substrate is pressure-insensitive and only used for temperature compensation.

The differences in temperature induced strain could be caused by the differences in the location of the piezoresistor and differences in the material underneath the resistors. To obtain the same temperature in both piezoresistors (and thereby be able to compensate for it) it is essential that the thermal environment for the two resistors is as equal as possible. The beam design according to the invention accomplishes this by locating two similar beams within the same reference cavity and thus exposing them to almost identical thermal environment and also limiting the fabrication variations between them.

Figure 11:
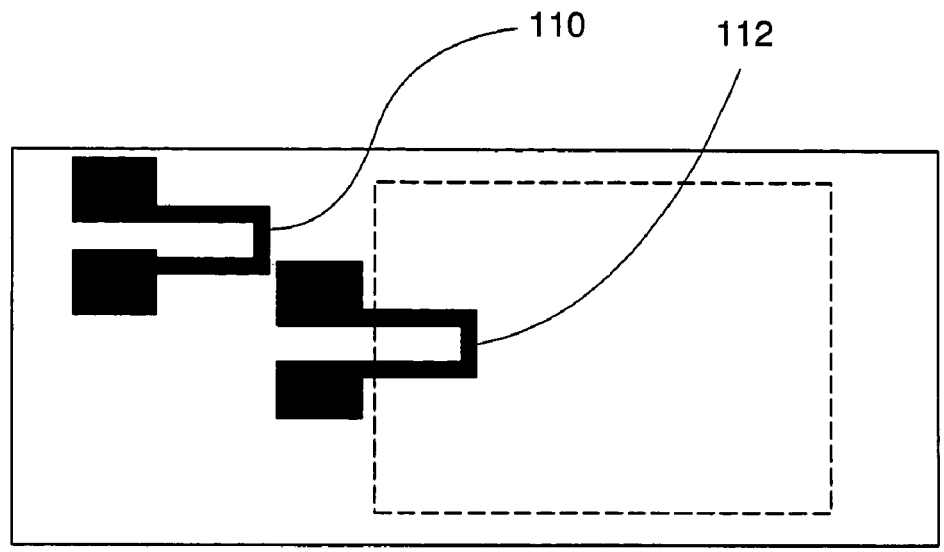
FIG. 11 shows a prior art design for temperature compensation.

The piezoresistor on the beam is surrounded by vacuum (low-pressure), thus, any thermal transport occurs mainly through the beam suspension points. A temperature compensation piezoresistor (not shown) located on the substrate 110, as illustrated in FIG. 11 (prior art), would therefore experience a different thermal environment than the pressure sensing strain gauge located on the leverage beam 112 inside the vacuum cavity.

According to the present invention, instead the passive piezoresistor (pressure insensitive) is located on a beam inside a vacuum cavity too, preferably the same vacuum cavity as the active piezoresistor (pressure sensitive), and preferably parallel to the pressuresensitive leverage beam, to create a thermal environment for both, which is very similar.

Figure 12:
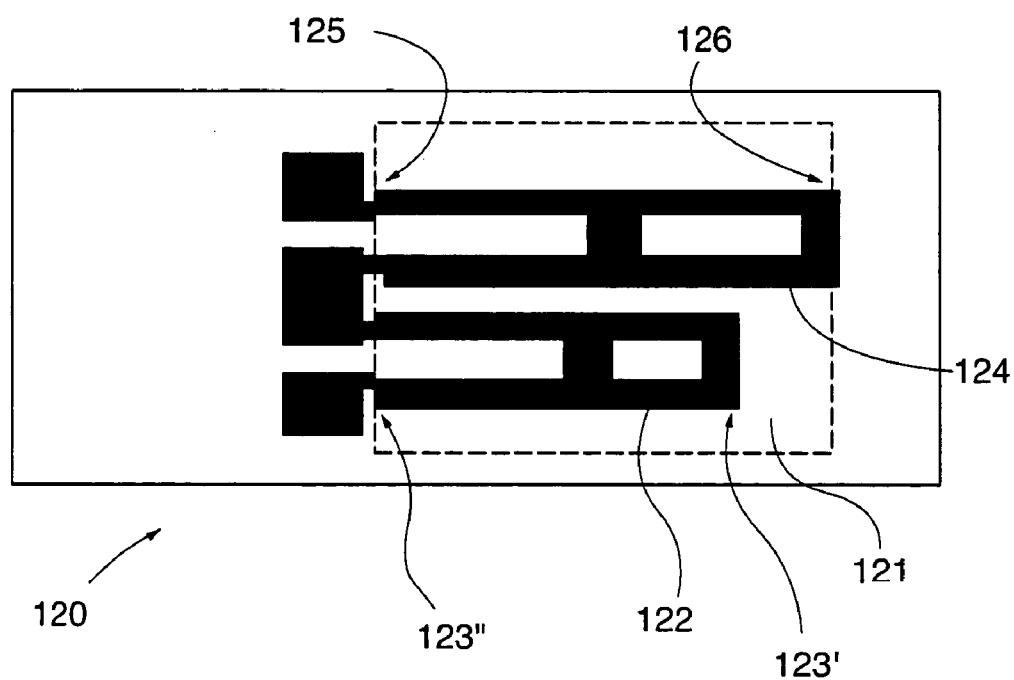
FIG. 12 shows temperature compensation according to the invention.

FIG. 12 illustrates the new sensor design. The sensor 120 comprises a pressure sensitive polysilicon diaphragm 121, and a force trancducing beam 122 (lower member in the figure), with a length of preferably 80% of the cavity side length, with a strain sensitive piezoresistor is attached to the underside of the diaphragm at 123'. The other end of the beam is attached to the cavity edge, indicated at 123" in the figure. Parallel and adjacent to the force-trancducing beam 122, another beam 124 (upper member in the figure) with a strain-gauge (not shown) is suspended in a manner that gives it a different pressure sensitivity. This property can be achieved e.g. by making it of a different length compared to the beam used for pressure measurement. It can either be shorter or longer, preferably 20% or 100% of the cavity side length. Alternatively this second beam can be attached at both ends to the cavity edge, at 125, 126 respectively. It is also possible to suspend both beams in the diaphragm at different locations to achieve the desired difference in sensitivity. Both the beams and the strain-gauges are fully enclosed inside the cavity, which functions as a pressure reference.

The new design with the dual beam accomplishes an almost identical thermal conductance between the piezoresistors and the substrate. Under the assumption that the heat transfer from the pressure sensing piezoresistor, through the beam, the attachment-point and the diaphragm to the fluid is negligible the thermal differences of the piezoresistors are also independent of the flow. Since both piezoresistors in the dual beam design are located on similar beams the new design also makes the differences in the temperature induced sensitivity smaller than for the traditional design.

Figure 13:
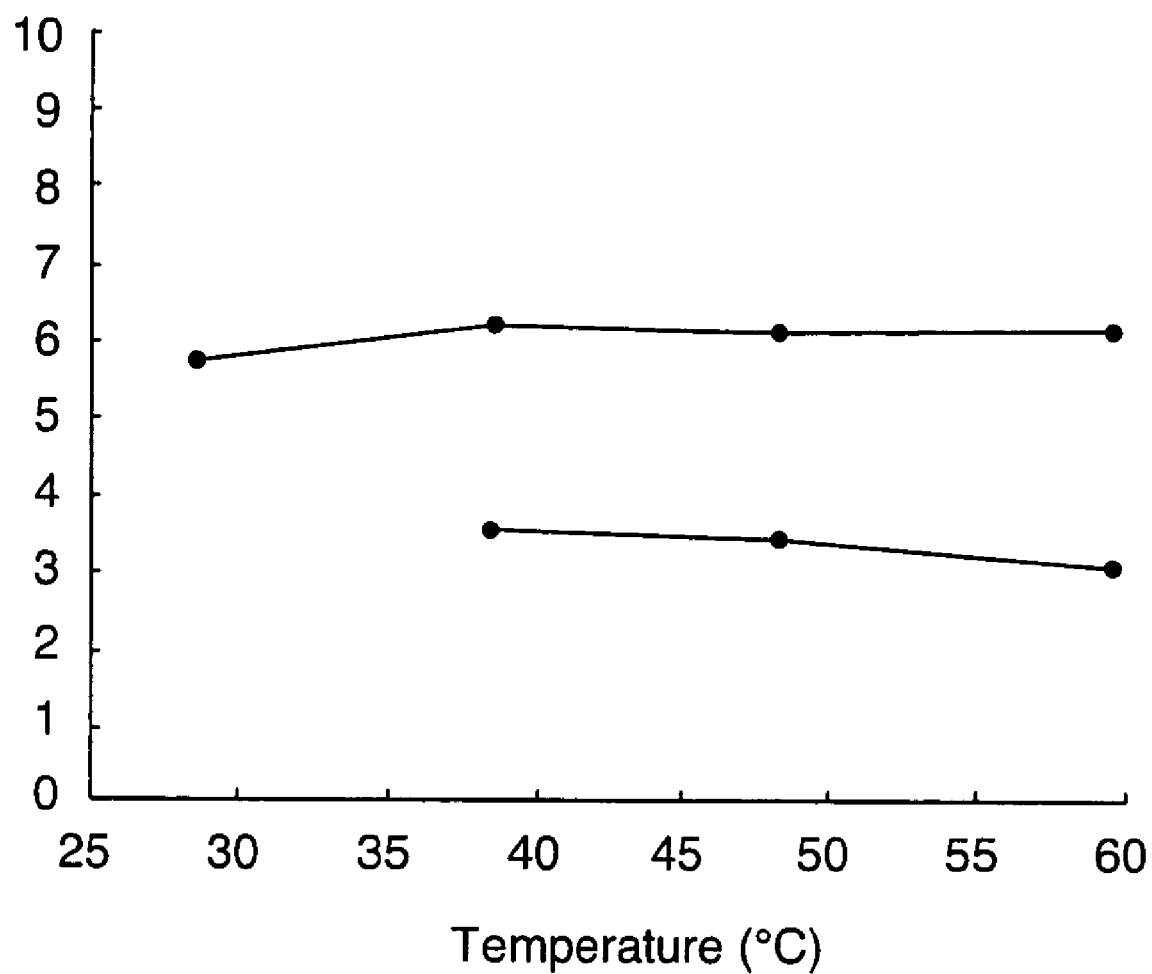
FIG. 13 is a graph showing improved relative temperature dependency mismatch for the invention compared to prior art.

FIG. 13 shows the low relative temperature dependency mismatch for the piezoresistors in the new design (bottom curve) compared to the traditional design (top curve).

The invention having been thus described is subject to various alterations and modifications and the skilled man would arrive at such alterations without inventive skills. E.g. other geometries of the beam are conceivable within the scope of the claimed invention.

The invention claimed is:

1. A miniaturized pressure sensor, comprising
a support body (10) having an upper surface and a depression (12) formed in said surface;
a diaphragm (14), covering said depression (12) so as to form a closed cavity, said diaphragm being responsive to external pressure by being deflected;
a strain gauge (16) disposed inside said cavity and beneath said diaphragm (14), cooperatively coupled to said diaphragm so as to generate an output signal in response to the deflection of said diaphragm, said strain gauge in at least one of its ends being suspended (18) by said diaphragm.

2. The sensor as claimed in claim 1, wherein said cavity is evacuated.

3. The sensor as claimed in claim 1, wherein the diaphragm material covers the entire upper surface of the support body.

4. The sensor as claimed in claim 1, wherein the strain gauge is formed from a piezo resistive material.

5. The sensor as claimed in claim 1, wherein the strain gauge comprises two legs (22, 24), connected to each other, said legs together forming a current conducting path (I).

6. The sensor as claimed in claim 5, wherein said legs are connected by a transverse member (26).

7. The sensor as claimed in claim 1, wherein the strain gauge has the general shape of an "H" or an "X" or a "Y" a "V" 1 or a "U".

8. The sensor as claimed in claim 5, wherein the legs of the strain gauge are attached to the support body, and wherein the other end, i.e. at or beyond the point where the legs are connected to each other is attached to the diaphragm.

9. The sensor as claimed in claim 6, wherein the transverse connecting member is located at a distance from the point of attachment on the support body that corresponds to at least 50% of the total length of the strain gauge.

10. The sensor as claimed in claim 1, wherein the point where the strain gauge is suspended by the diaphragm is located at a distance from the point of attachment in the support body that corresponds to at least 70%, preferably 80% of the width of the diaphragm in the direction of the strain gauge.

11. The sensor as claimed in claim 1, wherein the point where the strain gauge is suspended by the diaphragm is located at a distance from the point of attachment in the support body that corresponds to not more than 30%, preferably not more than 20% of the width of the diaphragm in the direction of the strain gauge.

12. The sensor as claimed in claim 1, wherein the strain gauge comprises a support beam, and a layer of a piezoresistive material disposed on said beam in a pattern forming a current path.

13. The sensor as claimed in claim 12, wherein said pattern has a general shape of a "U".

14. The sensor as claimed in claim 1, wherein there is provided a second strain gauge (124) in said cavity, the second strain gauge having a different pressure sensitivity than the other strain gauge (122).

15. The sensor as claimed in claim 14, wherein said second strain gauge (124) is arranged parallel and adjacent to the other strain gauge (122).

16. The sensor as claimed in claim 14, wherein said second strain gauge has a length that differs from the length of the other strain gauge.

17. The sensor as claimed in claim 14, wherein said second strain gauge is attached at both ends in the support body.

18. A miniaturized pressure sensor, comprising
a support body having an upper surface and a depression formed in said surface;
a diaphragm, covering said depression so as to form a closed cavity, said diaphragm being responsive to external pressure by being deflected;
a strain gauge attached at one end to said support body inside said cavity and beneath said diaphragm, and at another end suspended by said diaphragm.

19. A miniaturized pressure sensor, comprising a support body with an evacuated cavity formed therein, a diaphragm forming a sealing cover for said cavity, and a strain gauge disposed inside said cavity and coupled to the support body and said diaphragm such that a deflection of said membrane caused by a pressure exerted thereon causes a detectable change in strain in said strain gauge.

20. A miniaturized pressure sensor, comprising a diaphragm responsive to pressure by being deflected, and a freehanging strain gauge responsive to strain by yielding an electrical output signal, said strain gauge being suspended at one end by said diaphragm, such that a deflection of said diaphragm causes a detectable change in strain in said strain gauge.

21. The miniaturized pressure sensor as claimed in claim 20, wherein said diaphragm sealingly covers an evacuated cavity, and wherein said freehanging strain gauge is located inside said cavity, beneath said diaphragm.

22. A miniaturized pressure sensor, comprising a support body with an evacuated cavity formed therein, a diaphragm forming a sealing cover for said cavity, and a force transducing beam provided inside said cavity and beneath said diaphragm, and suspended by said diaphragm in at least one end of said beam by a suspension element having a finite length.

23. The miniaturized pressure sensor as claimed in claim 22, wherein the suspension element is arranged to cause a leverage, when the diaphragm is deflected due to a pressure exerted thereon, so as to move the beam correspondingly.

24. A miniaturized pressure sensor, as claimed in claim 1, wherein there are provided suspension elements having a finite length by which said beam or beams is/are suspended by said diaphragm in two points located on opposite sides of a midpoint of said diaphragm.

* * * * *